United States Patent Office 3,478,432
Patented Nov. 18, 1969

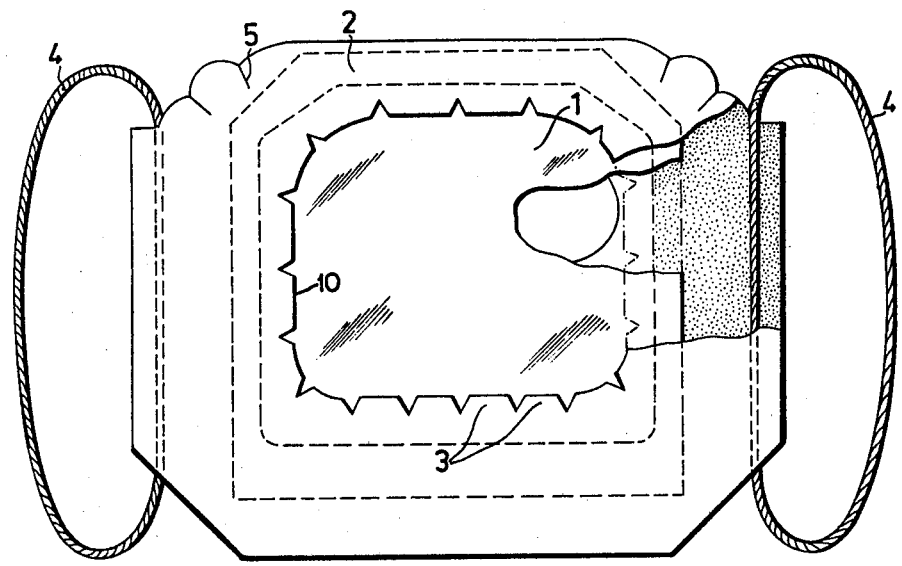
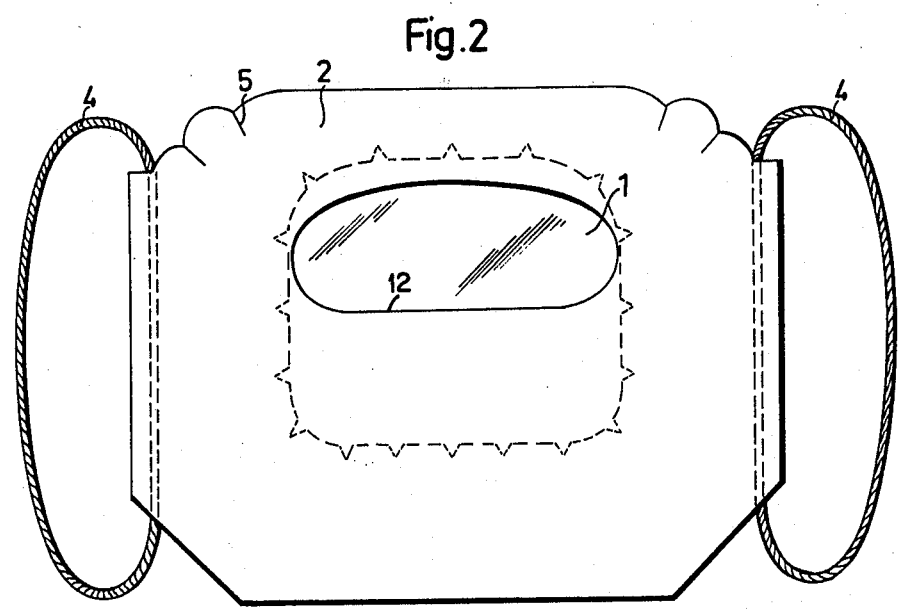

3,478,432
DENTAL ARTICLES
Carl-Axel Gross, Tandlakare, C-A Gross,
Rasundavagen 68, Solna, Sweden
Filed June 20, 1966, Ser. No. 558,791
Claims priority, application Sweden, June 29, 1965,
8,591/65
Int. Cl. A61c 5/00, 17/00
U.S. Cl. 32—35          5 Claims

ABSTRACT OF THE DISCLOSURE

A puncturable rubber sheet has a layer of saliva and liquid-absorbing material disposed at opposite faces thereof, the edges of the rubber sheet being secured between these layers by heat sealing and using a plastic material binding agent. Each of the layers of absorbent material has a cutout formed therethrough, the cutouts being of different size and at least partly overlapping one another. Inner edges of at least one of said layers of absorbent material include portions which overlie and are unconnected with the rubber sheet to form expandable pockets with the rubber sheet to collect liquid. Resilient loop-like members are secured to opposite sides of the device and are adapted to fit about the ears of the patient for keeping the device in position. Slits are also provided in the outer edges of the layers of absorbent material for the fixation of ligature wires.

---

When carrying out certain odontological works, such as root-fillings and silicate-cement-fillings, the dentist has to keep the area under treatment dry. That area is generally constituted by a single tooth or by a group of teeth. Normally, the drying is attained by the use of a rubber sheet through which the tooth is inserted. Thanks to the elasticity of the material, the rubber sheet will sealingly contact the lateral faces of the tooth while the crown of the tooth protrudes therethrough. Generally, the rubber sheet is pressed down to the neck of the tooth and fixed there by the use of special wires or by resilient clasps. It accordingly serves like a collar, the outer side of which is kept dry preventing admittance of saliva formed on the gingival side. Such a rubber sheet, often referred to as a cofferdam, does however possess a very substantial disadvantage. That drawback consists in the fact that the contact between the rubber material on the one hand and the gingival surfaces and mucous membranes in the mouth and the lips, on the other, heavily stimulates the generation of saliva. This not only disturbs the treatment, but furthermore, it is unpleasant to the patient.

The main object of the present invention is to eliminate the disadvantage above referred to by providing an arrangement which does not permit the formation of substantial disturbing amounts of saliva.

The invention will now be described in greater detail, reference being made to the accompanying drawing.

FIG. 1 is a horizontal view showing the external side of a device designed according to the present invention.

FIG. 2 shows the opposite side of the device, i.e. that side which during the treatment faces the adjacent portions of the mouth, the tongue, and the lips.

Reference numeral 1 designates a rubber sheet which is surrounded by an outer sheet 2. The latter consists of two layers. The upper layer has been partially broken away in FIG. 1 in order to show the lower layer. As seen in FIG. 1, the upper layer along the edge surrounding the rubber sheet 1 is provided with a number of sections 3 not secured to the rubber sheet but forming between themselves and said sheet grooves or pockets which are intended to collect saliva as well as liquids supplied during the treatment.

The two outer layers are suitably formed of a fibrous plastic-impregnated paper having good strength when in moistured condition. The connection between those layers and the rubber sheet may be obtained by heat-sealing. During the same operation, it is possible to secure to the two shorter sides of the devices elastic material loops 4 inserted between the two paper layers and intended to be slung around the ears of the patient for keeping the device in position. Due to these loops and the fixation at the tooth as above described, the entire device when in use will assume the shape of a bowl or a funnel at the apex of which the tooth penetrates the rubber sheet while protected from the surrounding area. Due to the fact that the outer sheet consists of entirely white paper, the operational area is bright which greatly facilitates the dentist's work. Reference numeral 5 designates a number of slits in the outer edge of the device. Those slits serve as recesses for ligature wires which in that way may in a simple and rapid manner be fixed and again removed upon completion of the treatment.

As seen in FIGURE 1, the upper layer of the outer sheet 2 has a cutout 10 formed through the central portion thereof. As seen in FIGURE 2, the lower layer of the outer sheet 2 has a cutout 12 formed therethrough. These cutouts are of different size and overlap one another as is clearly apparent from FIGURE 2 whereby the rubber sheet 1 is exposed at both faces of the device.

I claim:

1. A device for keeping an operational area in dentistry dry including a puncturable rubber sheet, a layer of saliva and liquid-absorbing material disposed at opposite faces of said rubber sheet and secured thereto, each of said layers of absorbent material having a cutout formed therethrough, the cutout formed in one layer being of different size than the cutout in the other layer, said cutouts at least partly overlapping one another whereby the rubber sheet is exposed on both faces of the device, at least one of said layers of absorbent material having formed along the inner edges thereof portions disposed in adjacent overlying relationship to the rubber sheet and unconnected therewith to form pockets for collecting saliva and liquids supplied during the dental treatment.

2. A device as defined in claim 1 wherein said layers of absorbent material are formed of plastic impregnated fibrous material.

3. A device as defined in claim 2 wherein the connection between said two layers of absorbent material and said rubber sheet is formed by heat sealing.

4. A device as defined in claim 1 including a pair of loop-like resilient elongated members to be slung around the ears of a patient for keeping the device in position.

5. A device as defined in claim 1 wherein said layers of absorbent material have slits formed therein for fixation of ligature wires.

References Cited

UNITED STATES PATENTS

| | | | |
|---|---|---|---|
| 300,600 | 6/1884 | Halsey | 32—34 |
| 465,265 | 12/1891 | Hansen | 32—35 |
| 671,929 | 4/1901 | Horgan | 32—34 |

ANTONIO F. GUIDA, Primary Examiner

CHARLES R. WENTZEL, Assistant Examiner